(12) United States Patent
Meyer et al.

(10) Patent No.: US 8,042,792 B2
(45) Date of Patent: Oct. 25, 2011

(54) HYDRAULIC ENGINE BEARING

(75) Inventors: Heinrich Meyer, Königswinter (DE); Peter Binner, Bonn (DE); Marc Stira, Bonn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 822 days.

(21) Appl. No.: 11/996,168

(22) PCT Filed: Jul. 3, 2006

(86) PCT No.: PCT/DE2006/001147
§ 371 (c)(1),
(2), (4) Date: Jan. 18, 2008

(87) PCT Pub. No.: WO2007/009418
PCT Pub. Date: Jan. 25, 2007

(65) Prior Publication Data
US 2008/0203634 A1 Aug. 28, 2008

(30) Foreign Application Priority Data
Jul. 19, 2005 (DE) .......................... 10 2005 034 212

(51) Int. Cl.
*F16F 13/00* (2006.01)
(52) U.S. Cl. .................................. 267/140.13
(58) Field of Classification Search ............. 267/140.12, 267/140.13, 140.14, 140.15, 140.2; 248/562, 248/566, 636; 137/844, 845, 846
See application file for complete search history.

(56) References Cited

U.S. PATENT DOCUMENTS
3,941,149 A * 3/1976 Mittleman ................ 137/493.1
(Continued)

FOREIGN PATENT DOCUMENTS
DE 42 38 752 C1 5/1994
(Continued)

*Primary Examiner* — Robert Siconolfi
*Assistant Examiner* — Mariano Sy
(74) *Attorney, Agent, or Firm* — McGlew and Tuttle, P.C.

(57) ABSTRACT

A hydraulic engine bearing for motor vehicles has a fluid-filled working chamber (4) surrounded by a rubber-elastic circumferential wall (3). A compensating chamber (7) is provided which is in connection with the working chamber (4) via an overflow duct (6) in a baffle plate (5) between the working chamber (4) and the compensating chamber (7). Another compensating chamber (10) is connected to the working chamber (4) via a bypass duct (9). The additional compensating chamber (10) is formed from an elastic bellows (11), which is surrounded on its outside by a fixed wall (12) and wherein an intermediate space (13) is arranged between the bellows (11) and the wall (12). The intermediate space can be filled with a compressible medium, preferably air, and the medium can be emptied by means of a switching device, wherein the switching device is formed from at least one non-return valve (14) and at least one on-off valve (15). The non-return valve (14) is arranged in a vent duct as a connection path of the intermediate space (13) to the outside of the fixed wall (12) such that only a flow of the medium present in the intermediate space (13) to the outside of the wall (12) is possible. The on-off valve (15) is arranged at a vent duct (17) as an additional connection path of the intermediate space (13) to the outside of the engine bearing and can close or open the vent duct (17).

20 Claims, 2 Drawing Sheets

U.S. PATENT DOCUMENTS

| | | | |
|---|---|---|---|
| 5,386,977 A * | 2/1995 | Quast | 267/140.13 |
| 6,386,527 B2 * | 5/2002 | Oberle | 267/140.14 |
| 6,523,816 B1 * | 2/2003 | Gastineau et al. | 267/140.14 |
| 7,040,607 B2 * | 5/2006 | Grassmuck | 267/140.14 |
| 7,448,605 B2 * | 11/2008 | Bretaudeau et al. | 267/140.14 |
| 2001/0030390 A1 | 10/2001 | Vermaerke et al. | |
| 2002/0149145 A1 * | 10/2002 | Genesseaux | 267/140.14 |
| 2003/0024593 A1 * | 2/2003 | Anzawa et al. | 140/14 |

FOREIGN PATENT DOCUMENTS

| | | |
|---|---|---|
| DE | 196 52 502 C2 | 6/1998 |
| DE | 199 19 186 A1 | 11/2000 |
| DE | 601 00 229 T2 | 2/2004 |
| DE | 699 08 722 T2 | 4/2004 |
| DE | 103 25 720 A1 | 12/2004 |
| EP | 1 031 759 A1 | 8/2000 |
| EP | 1 176 336 A1 | 1/2002 |
| EP | 1 614 931 A2 | 1/2006 |
| JP | 62028210 U | 2/1987 |
| JP | 62-28210 | 8/1994 |
| JP | 7305739 A | 11/1995 |
| JP | 2001304328 A | 10/2001 |
| JP | 2002115741 A | 4/2002 |
| JP | 2006022960 A | 1/2006 |

* cited by examiner

HYDRAULIC ENGINE BEARING

CROSS REFERENCE TO RELATED APPLICATIONS

This application is a United States National Phase application of International Application PCT/DE2006/001147 and claims the benefit of priority under 35 U.S.C. §119 of German Patent Application DE 10 2005 034 212.4 filed Jul. 19, 2005, the entire contents of which are incorporated herein by reference.

FIELD OF THE INVENTION

The present invention pertains to a hydraulic engine bearing, especially for motor vehicles, with a fluid-filled working chamber surrounded by a rubber-elastic circumferential wall and with a compensating chamber, which is in connection with the working chamber via an overflow duct.

BACKGROUND OF THE INVENTION

Various embodiments of such hydraulic engine bearings have been known from the state of the art. They are intended, as a rule, for mounting an internal combustion engine in a motor vehicle and shall prevent the transmission of disturbing vibrations and noises from the engine to the body. The vibrations introduced in this process into the mount of the internal combustion engine can be assigned, in principle, to two different classes.

The first type of vibrations is in a frequency range above approx. 30 Hz and is induced by the engine itself. These vibrations have, as a rule, a small amplitude of a few tenths of one mm.

The second type of vibrations is in a frequency range of up to 12 Hz and is initiated by passing over unevennesses of the road surface while driving the motor vehicle. These vibrations may lead to vibrating motions of the engine in case of unfavorable generation and reach much higher amplitudes than the first type of vibrations.

Based on the vibrations occurring in the engine area, it is seen that both the various static and dynamic forces holding the engine, which occur while driving and at idle, are to be absorbed by the engine bearing and the vibrations of the engine resulting therefrom are to be absorbed, and moreover, the transmission of acoustic vibrations, which propagate from the engine to the body and hence to the passenger compartment, are to be suppressed in order to improve the driving smoothness. Thus, such engine bearings must be adapted concerning the dynamic spring rate and loss angle of absorption in different frequency ranges.

The dynamic spring rate $c_{dyn}$ is an indicator of the muffling of noises of a hydraulic engine bearing and should have low values over the entire frequency range, but especially in the idle resonance range.

The dynamic loss angle $\delta_V$ is an indicator of the absorbing function of the engine bearing and should have a maximum in the range of a natural frequency of various magnitudes, which frequency depends on the engine and the vehicle, for driving and idle operation. Corresponding orders of magnitude of the natural frequency are, for example, the frequency range around 10 Hz for driving, whereas the frequency range around 40 Hz is to be considered to be a resonance range for the idle operation.

Controllable engine bearings, in which two different absorption states are brought about, in principle, as a rule, by a vacuum actuation, are known from the state of the art to optimize the various requirements of idle and driving for the absorption and uncoupling properties of engine bearings of this type.

For example, a hydraulic, vibration-absorbing bearing, in which a compensating chamber, which is in connection with the working chamber of the engine bearing for the absorbing function of the bearing, can be connected by means of a vacuum control, so that a harder or softer absorbing characteristic of the bearing is obtained, depending on the switched position, is known from DE 601 00 229 T2. Even though such a construction disclosed in the above-mentioned patent has proved to be successful, in principle, its design is relatively complicated and therefore unfavorable from the viewpoint of the manufacturing costs.

The drawbacks due to the costs arise especially from the fact that a vacuum actuation of the switching states of the bearing is associated with the installation of corresponding vacuum lines, which represent drawbacks in terms of both the material costs and due to the necessary installation work.

SUMMARY OF THE INVENTION

The object of the present invention is therefore to perfect a hydraulic engine bearing, especially for motor vehicles, with a fluid-filled working chamber, which is surrounded by a rubber-elastic circumferential wall; with a compensating chamber, which is in connection with the working chamber via an overflow duct in a baffle plate between the working chamber and the compensating chamber; and with another compensating chamber, which is connected to the working chamber via a bypass duct, wherein the other compensation chamber is formed from an elastic bellows, which is surrounded on its outside by a fixed wall, and wherein an intermediate space, which can be filled with a compressible medium, preferably air, through a switching device, is arranged between the bellows and the wall, and from which medium can be emptied, such that a low-cost control of the engine bearing in the absorbing states that are decisive for driving and idle operation is possible.

Moreover, reliable and low-maintenance actuation shall be guaranteed under all operating conditions.

According to the invention, a hydraulic engine bearing is provided for motor vehicles. The hydraulic engine bearing includes a fluid-filled working chamber surrounded by a rubber-elastic circumferential wall, a compensating chamber and an overflow duct in a baffle plate between the working chamber and the compensating chamber, the compensating chamber being in connection with the working chamber via the overflow duct. A bypass duct is provided as well as another compensating chamber connected to the working chamber via the bypass duct. The additional compensating chamber is formed from an elastic bellows, which is surrounded by a fixed wall on an outside. An intermediate space is arranged between the bellows and the wall, the intermediate space being filled with a compressible medium. A switching device is provided for emptying the medium from the another compensating chamber. The switching device comprises a non-return valve and an on-off valve.

The switching device is formed from at least one non-return valve and at least one on-off valve, wherein the non-return valve is arranged in the vent duct as a connection path between the intermediate space and the outside of the fixed wall such that only a flow of the medium present in the intermediate space to the outside of the wall is possible, and wherein the on-off valve is arranged at a vent duct as another connection path between the intermediate space and the outside of the wall and it can close or open the vent duct.

Due to the novel design of the switching device, all the essential components can be arranged within the engine bearing, and the supply lines of the preferably electrically operated on-off valves can be integrated in existing cable harnesses of the vehicle without problems. The manufacturing and assembly costs of a hydraulic engine bearing of this class can thus be significantly reduced by the switching device described.

To understand the mode of operation of the switching device, it shall first be pointed out that the described hydraulic engine bearings of this type are usually tuned to an absorption frequency in the range of approx. 10 Hz, in which the natural frequency for driving is usually located. Such a tuning is set by correspondingly setting the length and the cross section of the overflow duct between the working chamber and the compensating chamber.

The additional compensation chamber, which is also present and is likewise in connection with the working chamber through the bypass duct, can be connected by the switching device mentioned, so that the original absorption frequency of approx. 10 Hz is shifted into a higher frequency range above 20 Hz, in which the idle frequency of an internal combustion engine is usually located.

Thus, nearly optimal absorbing properties of the engine bearing can be embodied under all operating conditions by connecting and disconnecting the additional compensating chamber as desired for driving as well as for the idle operation. The additional compensating chamber is connected, corresponding to the switching device according to the present invention, by opening the vent duct by the electrically actuated on-off valve arranged in the engine bearing. The opening of the vent duct brings about the free inflow and outflow of the air from and into the intermediate space between the bellows forming the additional compensating chamber and the wall surrounding the bellows. Vibrations, which are introduced into the working chamber through the rubber-elastic circumferential wall of the working chamber, which said wall is connected to the engine directly via a corresponding mount and are transmitted to the fluid present within the working chamber, can be introduced from this working chamber into the additional compensating chamber via the bypass duct without any appreciable back pressure.

If the absorbing properties of the additional compensating chamber are not necessary for driving, because the engine bearing is to be tuned to the frequency range of approx. 10 Hz, the vent duct is closed by the on-off valve. After the vent duct has been closed, the vibrations, which continue to be introduced into the compensating chamber via the hydraulic fluid, cause the air cushion to be pressed out of the intermediate space via the non-return valve, which is additionally present and which permits the air to escape from the intermediate space, but blocks the entry of air. After the air cushion has been pressed out of the intermediate space, the bellows forming the compensating chamber adapts itself to the wall of the additional compensating chamber, which the wall surrounds the bellows, so that the introduction of vibrations into this additional compensating chamber is suppressed.

To restore the advantageous absorbing properties for the idle operation of the hydraulic engine bearing, the electrically actuated on-off valve is actuated such that the vent duct is operated such that a ventilated intermediate space is again obtained between the bellows and the surrounding wall of the additional compensating chamber.

An exemplary embodiment of the subject of the present invention will be explained in more detail below on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
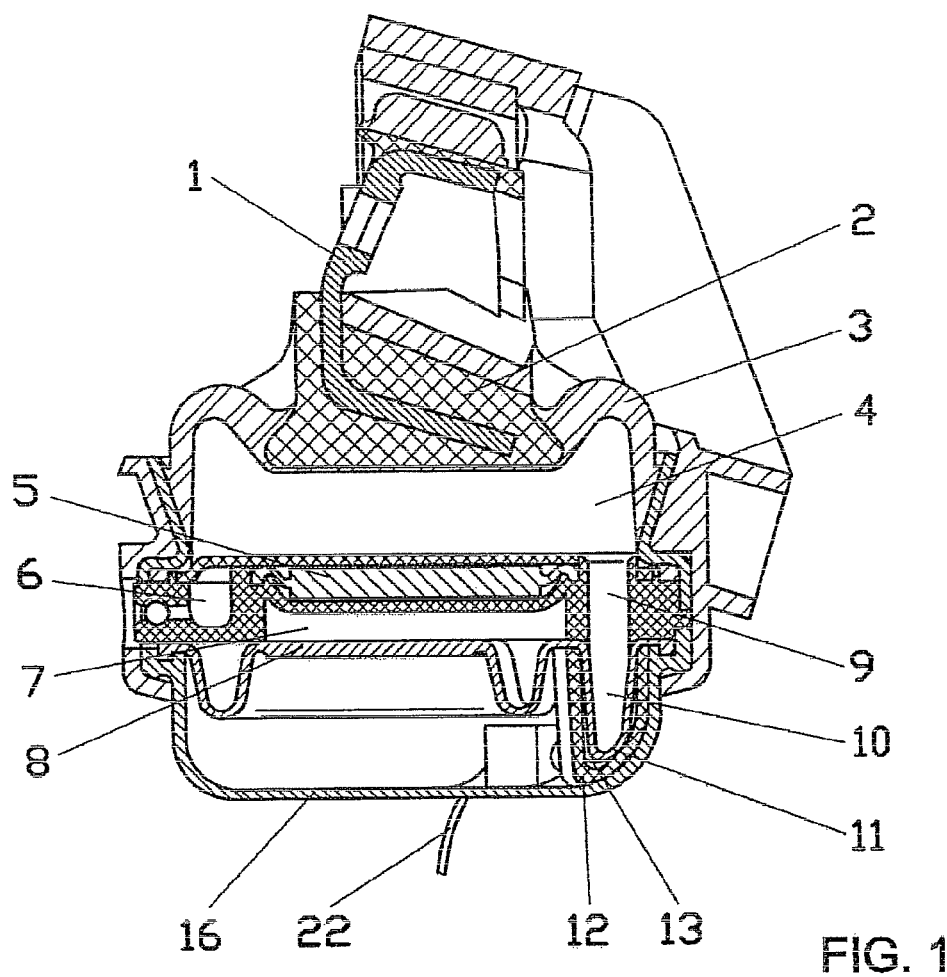
FIG. 1 is a sectional view of a hydraulic engine bearing according to the present invention.

Referring to the drawings in particular, in FIG. 1, the hydraulic engine bearing according to the present invention has, in its upper area, an engine-side fastening element 1, which is used to fix the engine bearing at an engine-holding point of the drive motor present in the motor vehicle. The fastening element 1 is attached via an intermediate part 2 to a rubber-elastic circumferential wall 3, the connection between the circumferential wall 3 and the intermediate part 2 being brought about, as a rule, by a vulcanization process. The circumferential wall 2 forms on its inside a so-called working chamber 4, which is filled with a hydraulic fluid.

Besides the circumferential wall 3, the working chamber 4 is defined by a baffle plate 5, which is arranged on the underside of the working chamber facing away from the intermediate part 2. An overflow duct 6, which establishes a connection with a compensating chamber 7 arranged under the baffle plate 5, is located within the baffle plate 5. The compensating chamber 7 is formed by the baffle plate 5, on the one hand, and a bellows 8 arranged under the baffle plate 5, on the other hand. The bellows 8 consists of an elastic material and is designed such that an essentially ring-shaped shape of the compensating chamber is obtained. Moreover, a bypass duct 9, which establishes a connection between the working chamber 4 and another compensating chamber 10 present in the lower area of the engine bearing, is located in the baffle plate 5. The compensating chamber 10 is defined, analogously to the compensating chamber 7, by a bellows 11 made of an elastic material, which is made in one piece with the bellows 8 forming the compensating chamber 7 in this exemplary embodiment. The compensating chamber 10 is surrounded on the outside of the bellows 11 by a wall 12, the bellows 11 and the wall 12 being designed such that an intermediate space 13 can be formed between them.

Two different absorbing characteristics are possible, in principle, in the hydraulic engine bearing being described due to the presence and the design of the additional compensating chamber 10. These different absorbing characteristics arise from the fact that the intermediate space 13 between the bellows 11 and the wall 12 surrounding the bellows can be filled with a compressible medium, preferably air, or that the bellows 11 comes into contact with the wall 12 without an inserted air cushion.

In the latter state, in which the bellows 11 is in contact with the wall 12, the engine bearing has an absorbing function solely due to the motion of the hydraulic fluid present in the working chamber 4, the overflow duct 6 as well as the compensating chamber 7. Vibrations of the drive motor introduced into the engine bearing via the fastening element 1 are now transmitted through the rubber-elastic circumferential wall 3 onto the hydraulic fluid within the working chamber 4, which leads to a partial displacement of the fluid from the working chamber 4 into the overflow duct 6. The fluid now enters the compensating chamber 7, where it partially displaces the air cushion present under the compensating chamber.

A further absorbing of the vibrations as a consequence of an additional absorbing device arranged within the baffle plate supports the overall absorbing function of the engine bearing. A more detailed explanation of the function is not given here, because it does not pertain to features essential for the present invention in this case.

Depending on the vibration-technical general conditions, tuning of the engine bearing to an absorption frequency present during driving in the range of about 10 Hz is brought about by selecting the length and the cross section of the overflow duct in conjunction with the additional absorbing device present in the baffle plate.

As was already described above, resonant vibrations in the range above 20 Hz develop during idle of the engine when the vehicle has been stopped, and tuning of the engine bearing to an absorption frequency of 10 Hz is not sufficient to absorb these vibrations. To offer a remedy here, the engine bearing described can be tuned to a higher absorption frequency in the range above 20 Hz by connecting the additional bypass duct 9.

It is necessary for this purpose to form an intermediate space 13 between the compensating chamber 10 and the wall 12 surrounding the bellows in order to make flow into the bypass duct 9 possible.

The two different switching states of the engine bearing can thus be embodied by filling the intermediate space 13 with a compressible medium, preferably air, and by emptying that medium from the intermediate space 13. The filling and emptying of the intermediate spacer 13 is carried out according to the present invention by means of a switching device, which comprises essentially two elements, namely, a non-return valve 14 as well as an on-off valve 15. Both elements of the switching device are shown for illustration in FIG. 2, which shows only the lower area of the hydraulic engine bearing in the area of the bottom cover 16. The bottom cover 16 forms the lower closure of the engine bearing and protects the bellows 8 forming the compensating chamber 7 from damage. At the same time, the wall 12 of the additional compensating chamber 10, which wall is designed as a trough, is arranged within the bottom cover 16 laterally, as is already apparent from FIG. 1. The wall 12 surrounding the bellows 11 is formed from a circumferential side wall 12a and a bottom 12b.

Figure 2:
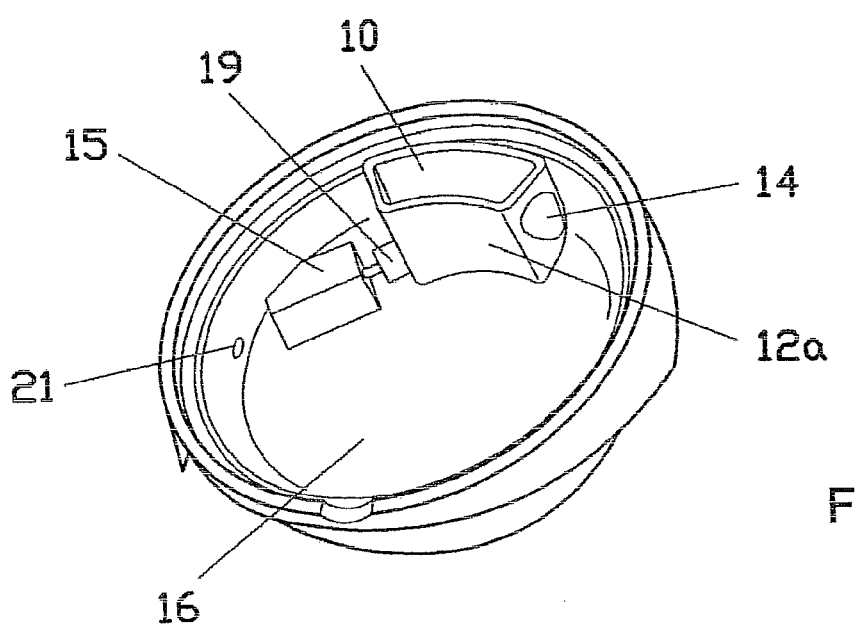
FIG. 2 is a perspective view of the lower housing part of the engine bearing from FIG. 1.

As can be determined from FIG. 2, a through hole (vent duct) 24, in which a non-return valve 14 made of an elastic material is arranged, is located in the side wall 12a. In addition, another vent duct 17, which can be opened or closed by the on-off valve 15, is located in the side wall 12a.

The on-off valve 15 is designed as an electrically actuated solenoid valve in the exemplary embodiment being shown. The solenoid valve has a design known from the state of the art and has a housing body 18 with a magnet coil located therein, a plunger 19 performing translatory motion as well as a valve plug 20 arranged at the front free end of the plunger 19. The vent duct 17 can be opened or closed towards the interior space of the bottom cover 16 by the retraction and extension of the plunger 19 corresponding to the enlarged view in FIG. 3. The bottom cover 16 has a vent opening 21 in its wall for air exchange with the outside of the engine bearing.

As can be determined from the figures, the entire actuating device is arranged within the bottom cover 16, and only the electric supply line 22 must be led to the outside through the bottom cover 16.

To explain how the two different switching states of the engine bearing are brought about, it is at first assumed that the on-off valve 15 is in the closed state and escape of the air present within the intermediate space 13 through the vent duct 17 is therefore not possible. However, since the non-return valve 14, which is designed such that only escape of air from the intermediate space 13 is possible, is arranged in the wall 12 of the compensating chamber 10 in addition to the on-off valve 15, the introduction of motions through the hydraulic fluid into the compensating chamber 10 can lead to the displacement of air in the intermediate space 13. If the air has been displaced from the intermediate space 13, the bellows 11 comes into contact with the wall 12, and an additional absorbing function of the compensating chamber 10 is therefore no longer available.

Consequently, only the compensating chamber 7 is active, so that the engine bearing according to the present invention operates in the classical manner as a vibration-absorbing bearing for driving. Vibrations of a low amplitude, for example, below 0.5 mm to 1 mm (and at a relatively high frequency, for example, above 20 Hz), are absorbed by means of the absorbing device, not discussed more specifically, within the baffle plate 5, whereas vibrations of a lower frequency (for example, below 20 Hz) and of a higher amplitude (for example, above 1 mm) are absorbed by the transfer of the hydraulic fluid into the overflow duct, the transfer being made possible by the air cushion present under the compensating chamber 7 within the bottom cover 16, which is partially displaced by the fluid entering the compensating chamber 7.

If the compensating chamber 10 shall provide an additional absorbing function during idle operation in respect to a displacement of the absorption frequency into a range above 20 Hz, the on-off valve 15 is opened to establish an air cushion in the intermediate space 13. Air can thus flow through the vent duct 17 from the bottom cover 16 into the intermediate space 13. Fluid can be additionally taken up due to this measure in the compensating chamber 10 via the bypass duct 9.

Figure 3:
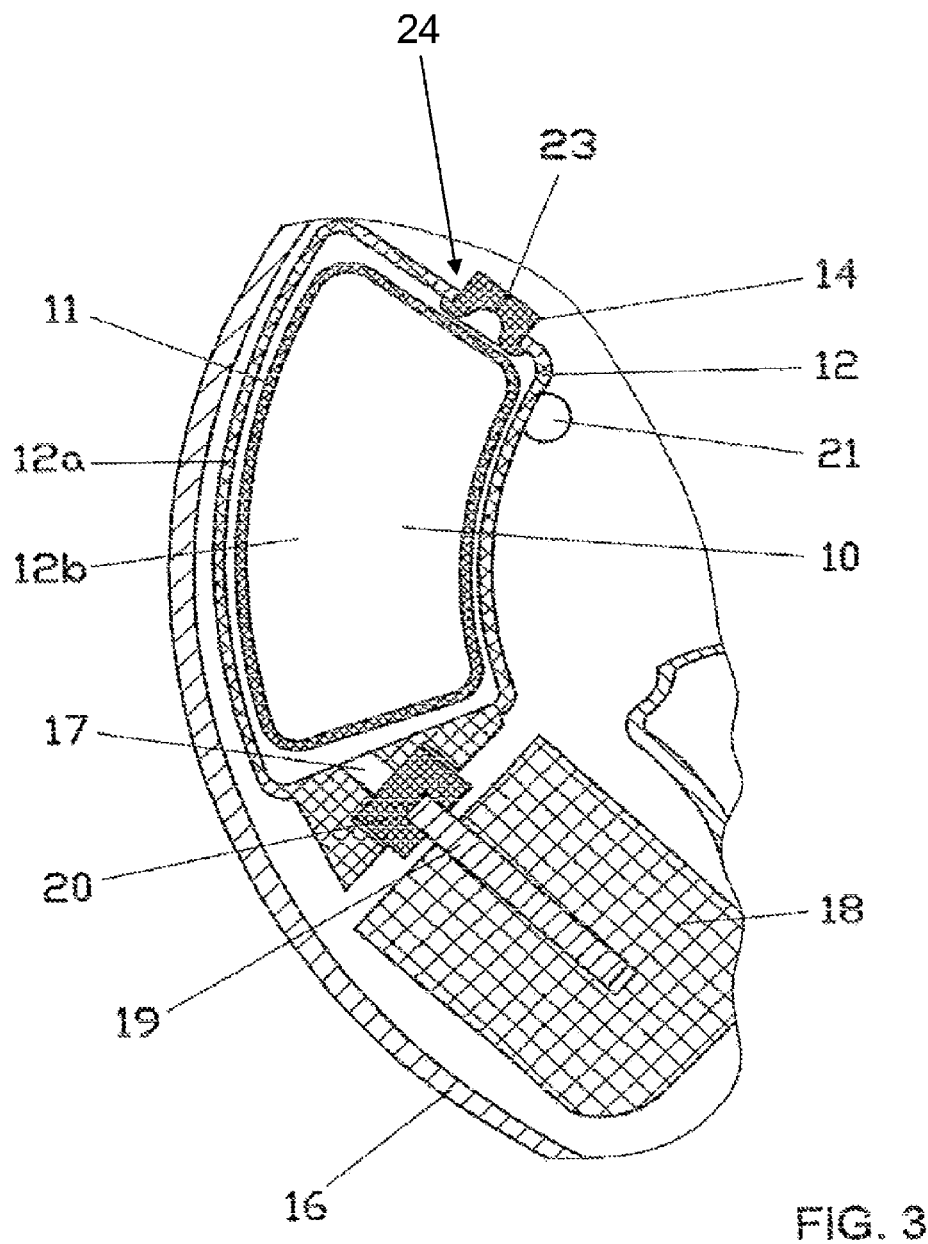
FIG. 3 is a top view of an enlarged detail of a partial area of the lower housing part from FIG. 2.

The shape of the non-return valve 14 appears especially from the enlarged view in FIG. 3. The non-return valve is a plug, which has a round or oval cross section, is made of an elastic material and has in its center a hole 23, which is usually closed by the elastic action of the material. If pressure is exerted on the non-return valve from the side of the non-return valve facing the intermediate space, the hole 23 opens minimally, so that the compressible medium, preferably air, which is present within the intermediate space 13, is able to escape. If the pressure on the non-return valve subsides as a consequence of the emptying of the intermediate space 13, the hole 23 is closed automatically, so that air is reliably prevented from flowing back into the intermediate space 13 from the inner area of the bottom cover 16.

The description of the present invention makes it clear that the novel switching device can be arranged entirely within the engine bearing housing and here within the interior space of the bottom cover 16. Contrary to the complicated actuation of engine bearings known from the state of the art by means of vacuum control, only the electric supply for the solenoid valve is necessary, which substantially reduces the assembly effort needed for the hydraulic engine bearing according to the present invention.

While specific embodiments of the invention have been shown and described in detail to illustrate the application of the principles of the invention, it will be understood that the invention may be embodied otherwise without departing from such principles.

LIST OF REFERENCE NUMBERS

1 Fastening element
2 Intermediate part
3 Circumferential wall
4 Working chamber
5 Baffle plate
6 Overflow duct
7 Compensating chamber
8 Bellows
9 Bypass duct
10 Compensating chamber
11 Bellows
12 Wall
12a Side wall
12b Bottom
13 Intermediate space
14 Non-return valve
15 On-off valve
16 Bottom cover
17 Vent duct
18 Housing body
19 Plunger
20 Valve plug
21 Vent opening
22 Supply line
23 Hole

The invention claimed is:

1. A hydraulic engine bearing for motor vehicles, the hydraulic engine bearing comprising:
    a fluid-filled working chamber at least partially surrounded by a rubber-elastic circumferential wall;
    a compensating chamber formed from an elastic bellows portion;
    an overflow duct in a baffle plate between the working chamber and the compensating chamber, said compensating chamber being in connection with the working chamber via said overflow duct;
    a bypass duct;
    another compensating chamber connected to said working chamber via said bypass duct, said another compensating chamber being formed from another elastic bellows portion, which is surrounded by a fixed wall on an outside and an intermediate space is arranged between the another bellows portion and the wall, said intermediate space being filled with a compressible medium;
    a switching device for emptying said medium from said another compensating chamber, said switching device comprising a non-return valve and an on-off valve, wherein said non-return valve is arranged in a vent duct as a connection path of said intermediate space to outside of said fixed wall such that only flow of the compressible medium present in said intermediate space to the outside of said wall is possible, and wherein said on-off valve is arranged at another vent duct as an additional connection path of said intermediate space to the outside of the engine bearing, said on-off valve for closing and opening said another vent duct.

2. A hydraulic engine bearing in accordance with claim 1, wherein said on-off valve comprises an electrical solenoid on-off valve.

3. A hydraulic engine bearing in accordance with claim 1, wherein said non-return valve comprises a plug consisting of an elastic material with a centrally arranged hole.

4. A hydraulic engine bearing in accordance with claim 1, wherein said on-off valve is arranged within a housing of said engine bearing under said compensating chamber.

5. A hydraulic engine bearing in accordance with claim 1, wherein said vent duct and said another vent duct are arranged in a lower area of said compensating chamber, said lower area facing away from said bypass duct.

6. A hydraulic engine bearing in accordance with claim 1, wherein said elastic bellows and said another bellows are formed of a single integral elastic bellows part.

7. A motor vehicle hydraulic engine bearing comprising:
    an engine fastening element;
    a rubber-elastic circumferential wall connected to said engine fastening element;
    a baffle plate, said rubber-elastic circumferential wall and said baffle plate cooperating to define a fluid-filled working chamber partially surrounded by said rubber-elastic circumferential wall;
    an elastic bellows portion cooperating with said baffle plate to define a compensating chamber, said baffle plate forming an overflow duct between said working chamber and said compensating chamber, said compensating chamber being in connection with the working chamber via said overflow duct and said baffle pate forming a bypass duct;
    another elastic bellows portion forming another compensating chamber connected to said working chamber via said bypass duct;
    a wall on an outside of said another elastic bellows portion, an intermediate space being arranged between said another bellows portion and said wall, said intermediate space being filled with a compressible medium; and
    a switching device for emptying said medium from said another compensating chamber, said switching device comprising a non-return valve and an on-off valve, wherein said non-return valve is arranged in a vent duct as a connection path of said intermediate space to outside of said wall such that only flow of the compressible medium present in said intermediate space to the outside of said wall is possible, and wherein said on-off valve is arranged at another vent duct as an additional connection path of said intermediate space to the outside of the engine bearing, said on-off valve for closing and opening said another vent duct.

8. A motor vehicle hydraulic engine bearing in accordance with claim 7, wherein said on-off valve comprises an electrical solenoid on-off valve.

9. A motor vehicle hydraulic engine bearing in accordance with claim 7, wherein said non-return valve comprises a plug consisting of an elastic material with a centrally arranged hole.

10. A motor vehicle hydraulic engine bearing in accordance with claim 7, wherein said on-off valve is arranged within a housing of said engine bearing under said compensating chamber.

11. A motor vehicle hydraulic engine bearing in accordance with claim 7, wherein said vent duct and said another vent duct are arranged in a lower area of said compensating chamber, said lower area facing away from said bypass duct.

12. A motor vehicle hydraulic engine bearing in accordance with claim 7, wherein said elastic bellows portion and said another elastic bellows portion are made in one piece.

13. A hydraulic engine bearing in accordance with claim 7, wherein said non-return valve and said vent duct are arranged at one side of said fired wall.

14. A hydraulic engine bearing in accordance with claim 13, wherein said another vent duct and said on-off valve are arranged at another side of said wall.

15. A hydraulic engine bearing in accordance with claim 14, further comprising a cover, at least a portion of said cover being connected to said bellows, wherein at least said on-off valve is in contact with said cover.

16. A hydraulic engine bearing in accordance with claim 7, wherein said non-return valve and said vent duct are arranged at one side of said wall.

17. A hydraulic engine bearing in accordance with claim 16, wherein said another vent duct and said on-off valve are arranged at another side of said wall.

18. A hydraulic engine bearing in accordance with claim 17, further comprising a cover, at least a portion of said cover being connected to said elastic bellows portion, wherein at least said on-off valve is in contact with said cover.

19. A motor vehicle hydraulic engine bearing, comprising:
an engine fastening element;
a rubber-elastic circumferential wall connected to said engine fastening element;
a baffle plate, said rubber-elastic circumferential wall and said baffle plate cooperating to define a fluid-filled working chamber partially surrounded by said rubber-elastic circumferential wall;
an elastic bellows portion cooperating with said baffle plate to define a compensating chamber, said baffle plate forming an overflow duct between said working chamber and said compensating chamber, said compensating chamber being in connection with the working chamber via said overflow duct and said baffle pate forming a bypass duct;
another elastic bellows portion forming another compensating chamber connected to said working chamber via said bypass duct;
a wall on an outside of said another elastic bellows portion, said another bellows portion and said wall defining at least a portion of an intermediate space, said intermediate space being filled with a compressible medium; and
a switching device for emptying said medium from said another compensating chamber, said switching device comprising a non-return valve and an on-off valve, said non-return valve being arranged along said wall, said wall comprising a vent duct, said on-off valve being movable from a closing position and an open position, said compressible medium passing from said intermediate space to outside said wall via said non-return valve with said on-off valve in said closing position to define a first compressible medium flow path, said compressible medium passing from outside said wall into said intermediate space via said vent duct with said on-off valve in said open position to define a second compressible medium flow path.

20. A hydraulic engine bearing in accordance with claim 19, wherein said non-return valve is arranged at one portion of said wall, said on-off valve being arranged at another portion of said wall.

* * * * *